United States Patent [19]
Crutchfield

[11] 3,796,443
[45] Mar. 12, 1974

[54] TRACTOR RIG AND TRAILER HITCH
[75] Inventor: J. Warren Crutchfield, Palms, Calif.
[73] Assignee: The Raymond Lee Organization Inc., New York, N.Y. ; a part interest
[22] Filed: Dec. 30, 1971
[21] Appl. No.: 213,896

[52] U.S. Cl. ...... 280/406 A, 280/423 R, 280/446 B, 280/423 B, 280/493, 280/512
[51] Int. Cl. ............................................ B62d 53/04
[58] Field of Search ............ 280/496, 406 A, 423 R, 280/494, 493, 492, 446 B

[56] References Cited
UNITED STATES PATENTS
3,400,948  9/1968  Matson ........................ 280/406 A
3,520,556  7/1970  Warner ........................ 280/406 A
2,731,276  1/1956  Cross ............................... 280/81
3,650,546  3/1972  Koenig ........................ 280/423 R
2,647,761  8/1953  Kentz ........................ 280/496 X Primary Examiner—Leo Friaglia
Attorney, Agent, or Firm—Howard I. Podell

[57] ABSTRACT

An improved trailer towing hitch device in which the towing bar is fastened to the tractor directly above the tractor rear axle, with combined lift and anti-sway bars which are attached to the conventional "A" frame trailer hitch unit, said anti-sway bars being readily disconnected from the tractor towing mechanism, independently of the ball and socket connection of the trailer hitch to the towing bar.

3 Claims, 5 Drawing Figures

PATENTED MAR 12 1974
3,796,443
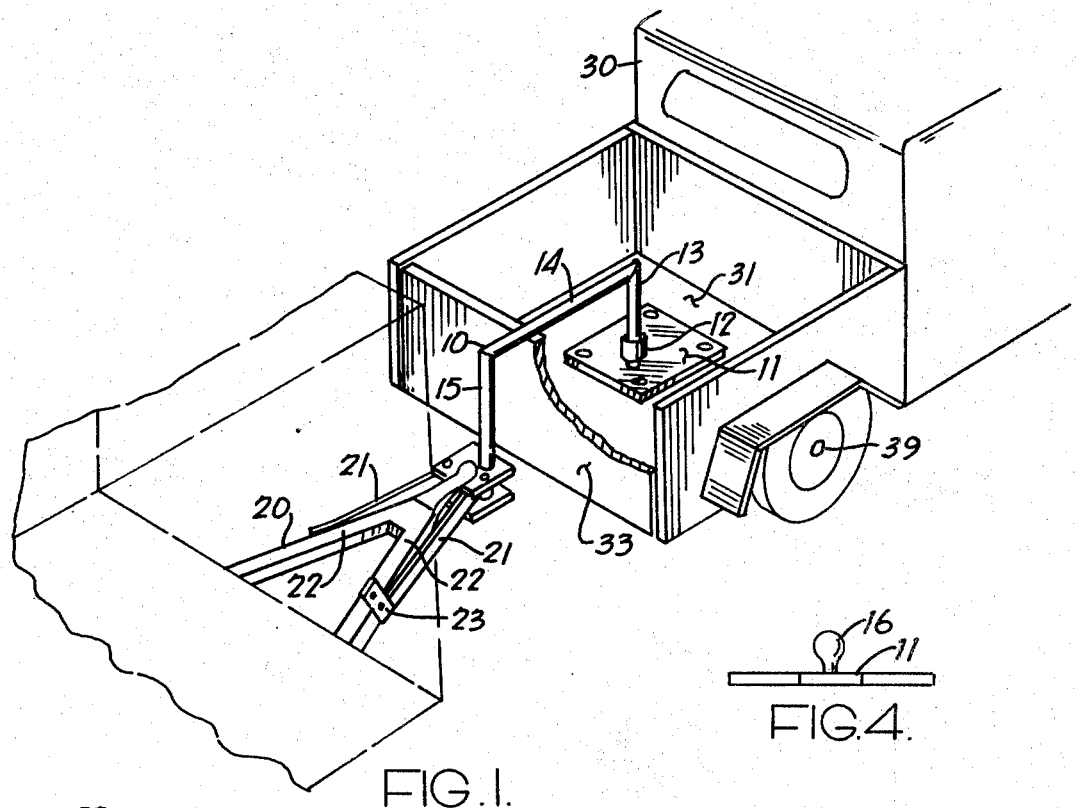
FIG.1.
FIG.4.
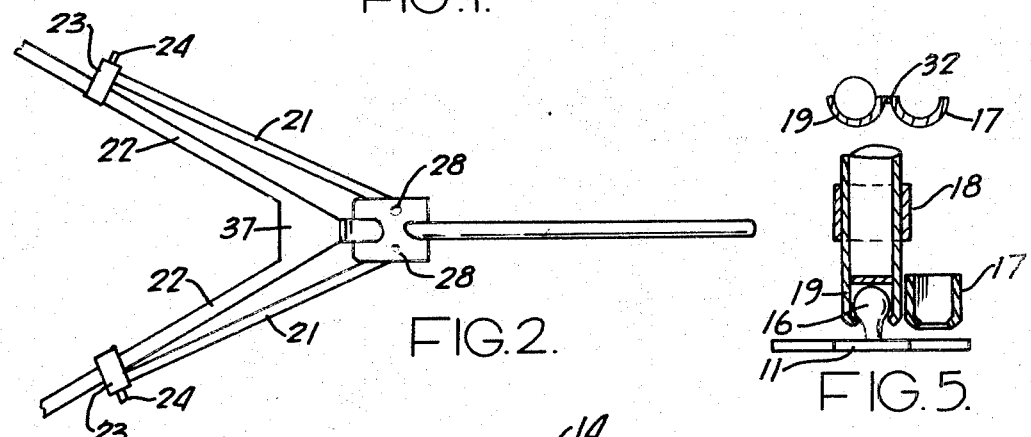
FIG.2.
FIG.5.
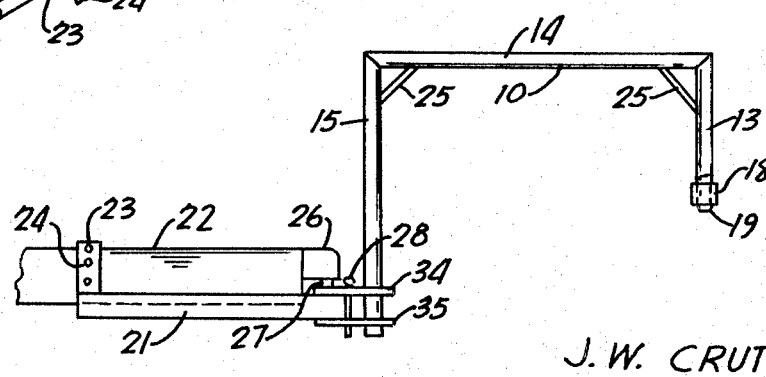
FIG.3.
INVENTOR.
J. W. CRUTCHFIELD
BY Howard I. Podell
AGENT

TRACTOR RIG AND TRAILER HITCH

SUMMARY OF THE INVENTION

This invention relates to a means of towing trailers, and more specifically to a towing hitch connecting a tractor and the hitch of a towed trailer.

The tractor towing hitch of this invention is readily connected to, or disconnected from, the tractor vehicle, and features readily attached combined lift and anti-sway bars.

An advantage of this invention is that the tractor rig and the anti-sway bars may be readily attached to a conventional "A" frame trailer towing hitch with the tractor rig mounted directly over the rear axle of the tractor.

The tractor towing hitch is fastened to a ball, which is mounted above a plate fastened to the floor of an open pick-up truck, directly above the truck axle. Preferably constructed of metal tubing, the forward end of the hitch tractor frame includes a vertical cube, the lower end of which terminates in a socket adaptable to be fastened to the ball mounted on the truck. The said vertical member of the tractor rig is integrally joined to a horizontal tube at its upper end; with said horizontal tube integrally joined to the upper end of a rear vertical member which is fastened at its lower end, by means of a horizontally rotatable joint to the attachment member of the rig.

The said attachment member consists of two parallel horizontal plates, a solid ball being mounted on the upper plate for connection to the trailer hitch female socket. Vertically aligned holes in the two horizontal plates of the attachment member permit the installation of metal pins to hold the forward end of the trailer hitch anti-sway bars. The trailer hitch may be of the conventional A-frame construction, terminating in a female socket adaptable for linking to a ball, with the forward end of each anti-sway bar linked to the tractor attachment member. Each anti-sway bar is fastened parallel to one of the tension members of the A-frame trailer hitch, with a clamp at the rear end of the anti-sway bar fastened to the adjacent tension member of the A-frame trailer hitch.

BRIEF DESCRIPTION OF THE DRAWING

The objects and features of the invention may be understood with reference to the following detailed description of an illustrative embodiment of the invention, taken together with the accompanying drawing in which:

FIG. 1 is a perspective view of the tractor hitch assembly mounted on the open back of a pick-up truck and fastened to a trailer hitch;

FIG. 2 is a plan view of the assembled hitch units;

FIG. 3 is a side view of the hitch assembly;

FIG. 4 is a side view of the truck mounting plate; and

FIG. 5 is a partial side view in cross-section of the joint of the towing hitch and the truck mounting unit.

DESCRIPTION OF THE PREFERRED EMBODIMENT

Turning now descriptively to the drawing, in which similar reference characters denote similar elements throughout the several views, FIG. 1 illustrates the towing hitch 10 attached to plate 11 mounted on the floor 31 directly over the axle 39 of a tractor pick-up truck 30.

The towing hitch 10, as shown in FIG. 1-3 consists of a vertical member 13 which is fastened at its lower end to the tractor plate 11, and at its upper end to a horizontal member 14 which extends rearwood, over the tractor rear side 33, joining vertical member 15 which extends downwards to the level of the trailer hitch 20.

Vertical member 15 of the towing hitch 10 is integrally fastened at its lower end to two parallel horizontal plates 34 and 35. A hitch ball 27 is fastened to the upper plate 34, adaptable for fitting into the female socket 26 of the trailer hitch 20.

Referring to FIG. 4 and FIG. 5 towing hitch 10 is adaptable to be fastened to the tractor hitch ball 16 mounted on plate 11 on the truck floor 31, by means of split socket 19. Socket member 17 rotates about vertical hinge 32, so as to enclose tractor mounted hitch ball 16 in the closed position. Coupler tube 18 drops over the split socket 19 in the closed mode, retaining hinged socket member 17 in the locked-on position.

Brackets 25 may be fastened to the corners of the vertical and horizontal members of the towing rig 10 to reinforce the structure.

The trailer hitch 20 is of the conventional A-frame construction consisting of two horizontal converging members 22 which join together at their forward juncture 37 with a female socket 26 adaptable for fitting onto the standard hitch ball 27 fastened to towing hitch 10.

A combination anti-sway and lift bar 21 fastens to each of the converging members 22 of the A-frame of the trailer rig 20, by means of clamp 23 and clamp fasteners 24. The anti-sway lift bar 21 fastens at its forward end between horizontal plates 34 and 35 of the towing hitch 10 by means of pins 28 which provide rotational freedom of the bar 21 about pin 28. The anti-sway lift bars 21 are preferably fabricated of heat treated spring steel to control unwanted movement of the trailer when it is being towed. As shown in FIG. 2 and FIG. 3, pins 28 pass through vertical sleeves or apertures at the forward end of bars 21.

Since obvious changes may be made in the specific embodiment of the invention described herein, it is indicated that all matter contained herein is intended as illustrative and not as limiting in scope.

Having thus described my invention, what I claim as new and desire to secure by Letters Patent of the United States is:

1. An improved towing device, adaptable for fastening to a conventional A-frame trailer hitch, comprising a foward end of the towing bar assembly fastened to the tractor vehicle directly above the rear axle of the towing vehicle, two combination anti-sway and lift bars, one of which fastens to the outside of each of the two converging tension members of the A-frame trailer hitch, both said anti-sway lift bars pivotably fastened between two horizontal plates integrally mounted to the rear end of the towing bar assembly, and a conventional hitch ball mounted to the upper of said horizontal plates, said hitch ball being adaptable for structurally linking with the female socket of the trailer hitch, with the towing bar assembly joined to a hitch ball mounted on the floor of the towing vehicle by means of a split socket at the forward end of the towing bar assembly, said socket consisting of a hinged member which is maintained in the closed position about the hitch ball by latching means.

2. The combination recited in claim 1 in which said latching means consist of a hollow tubular collar which rides over said split socket when the split socket is in the closed position so as to prevent the hinged member of the split socket from rotating about the hinge axis.

3. The combination as recited in claim 2 in which the vertical axis of the hitch ball, mounted on the rear of the towing bar assembly, is located between the vertical axes of the pins which fasten each of the anti-sway lift bars to the towing bar assembly.

* * * * *